(12) United States Patent
Okumura et al.

(10) Patent No.: US 11,298,917 B2
(45) Date of Patent: Apr. 12, 2022

(54) DECORATIVE MEMBER AND MANUFACTURING METHOD THEREOF

(71) Applicants: TOYODA GOSEI CO., LTD., Kiyosu (JP); SHINKO NAMEPLATE CO., LTD., Sagamihara (JP)

(72) Inventors: Koji Okumura, Kiyosu (JP); Hideto Maeda, Kiyosu (JP); Tatsuya Oba, Kiyosu (JP); Daiichiro Kawashima, Kiyosu (JP); Mitsuo Yoshida, Sagamihara (JP)

(73) Assignees: TOYODA GOSEI CO., LTD., Aichi-pref. (JP); SHINKO NAMEPLATE CO., LTD., Sagamihara (JP)

( * ) Notice: Subject to any disclaimer, the term of this patent is extended or adjusted under 35 U.S.C. 154(b) by 0 days.

(21) Appl. No.: 16/828,044

(22) Filed: Mar. 24, 2020

(65) Prior Publication Data
US 2020/0223183 A1 Jul. 16, 2020

Related U.S. Application Data

(62) Division of application No. 15/351,581, filed on Nov. 15, 2016, now abandoned.

(30) Foreign Application Priority Data

Nov. 16, 2015 (JP) .............................. JP2015-224061

(51) Int. Cl.
*B32B 15/04* (2006.01)
*B44C 3/02* (2006.01)
(Continued)

(52) U.S. Cl.
CPC .............. *B32B 15/04* (2013.01); *B32B 27/06* (2013.01); *B32B 37/14* (2013.01); *B44C 3/025* (2013.01);
(Continued)

(58) Field of Classification Search
CPC ......... B32B 15/04; B32B 27/06; B32B 37/14; B32B 2307/412; B32B 2310/0843;
(Continued)

(56) References Cited

U.S. PATENT DOCUMENTS 5,761,801 A 6/1998 Gebhardt et al.
6,961,023 B2 11/2005 Fujii et al.
(Continued)

FOREIGN PATENT DOCUMENTS

EP 1 972 504 A2 9/2008
EP 2 006 119 A2 12/2008
(Continued)

OTHER PUBLICATIONS

Extended European Search Report dated Mar. 17, 2017 issued in corresponding EP application No. 16198848.0.
(Continued)

*Primary Examiner* — Joel M Attey
*Assistant Examiner* — Yeong Juen Thong
(74) *Attorney, Agent, or Firm* — Posz Law Group, PLC

(57) ABSTRACT

A decorative member includes: a transparent resin layer provided on a rear surface thereof with a general portion, a stepped portion recessed or protrudingly provided with respect to the general portion, and an inclination portion provided between the stepped portion and the general portion; and a decorative layer provided on the rear surface, wherein: an inclination angle of the inclination portion with respect to a normal line of the general portion is equal to or more than 25° and is equal to or less than 40°; a width of the inclination portion is large beyond 0.38 mm and is equal to or less than 1 mm; and the decorative layer includes: a first layer that covers the stepped portion of the rear surface; and a second layer that covers a part of the rear surface, which is not covered by at least the first layer.

4 Claims, 9 Drawing Sheets

(51) Int. Cl.
  *B60R 13/02* (2006.01)
  *G01S 7/03* (2006.01)
  *B32B 27/06* (2006.01)
  *B32B 37/14* (2006.01)
  *G01S 13/931* (2020.01)

(52) U.S. Cl.
  CPC ............... *B60R 13/02* (2013.01); *G01S 7/03* (2013.01); *B32B 2307/412* (2013.01); *B32B 2310/0843* (2013.01); *B32B 2451/00* (2013.01); *G01S 2013/93271* (2020.01)

(58) Field of Classification Search
  CPC ..... B32B 2451/00; B44C 3/025; B60R 13/02; G01S 7/03; G01S 2013/93271; B23K 26/362; B23K 26/364; B23K 26/38
  USPC ............ 219/121.67, 121.68, 121.69, 121.72; 427/554, 555
  See application file for complete search history.

(56) References Cited

U.S. PATENT DOCUMENTS

| | | | |
|---|---|---|---|
| 7,295,166 B2 | 11/2007 | Fujii et al. | |
| 2004/0125023 A1* | 7/2004 | Fujii | H01Q 1/3291 343/700 MS |
| 2006/0188817 A1* | 8/2006 | Morita | G11B 7/24079 430/270.16 |
| 2006/0284335 A1* | 12/2006 | Fujii | H01Q 1/3283 264/255 |
| 2008/0224455 A1* | 9/2008 | Griebel | B23K 26/0622 280/728.3 |
| 2010/0028610 A1 | 2/2010 | Fujii et al. | |
| 2012/0015453 A1* | 1/2012 | Yamamuro | H01L 31/046 438/4 |
| 2012/0211477 A1* | 8/2012 | Chacin | B23K 26/035 219/121.69 |
| 2014/0072773 A1* | 3/2014 | Bergstrom | B05D 5/06 428/174 |
| 2014/0093665 A1* | 4/2014 | Horibe | B60R 13/04 428/31 |
| 2016/0031041 A1 | 2/2016 | Goto et al. | |

FOREIGN PATENT DOCUMENTS

| | | |
|---|---|---|
| GB | 2 243 805 A | 11/1991 |
| JP | 2009-017125 A | 1/2009 |
| JP | 2009-124485 A | 6/2009 |
| JP | 2010-030215 A | 2/2010 |
| JP | 2010-188987 A | 9/2010 |
| JP | 2010188987 * | 9/2010 |
| WO | 2014/167870 A1 | 10/2014 |

OTHER PUBLICATIONS

Office Action dated Jul. 17, 2018 issued in corresponding CN patent application No. 201611022012.X (and English translation).
Office Action dated Oct. 18, 2018 issued in corresponding JP patent application No. 2015-224061 (and English machine translation).
Office Action dated Jun. 25, 2019 issued in corresponding EP patent application No. 16 198 848.0.

* cited by examiner

DECORATIVE MEMBER AND MANUFACTURING METHOD THEREOF

CROSS-REFERENCE TO RELATED APPLICATION(S)

This application is a divisional of U.S. patent application Ser. No. 15/351,581 filed on Nov. 15, 2016, which is based upon and claims the benefit of priority from Japanese Patent Application No. 2015-224061, filed on Nov. 16, 2015, the entire contents of which are incorporated herein by reference.

BACKGROUND

1. Field of the Invention

The present invention relates to a decorative member used in an emblem and the like and a manufacturing method thereof.

2. Description of the Related Art

A radio wave transmission cover for a vehicle is generally provided with a decorative layer for displaying various designs. The decorative layer is a relative thin layer formed by metal deposition, film transfer and the like. The radio wave transmission cover is mainly configured with a transparent resin layer of a front side and a base layer of a rear side while interposing the decorative layer between the transparent resin layer and the base layer. The radio wave transmission cover is formed to have a uniform thickness such that transmission/reception of millimeter waves is not affected.

In order to express three-dimensional characters or figures on the radio wave transmission cover, for example, a rear surface of the transparent resin layer is employed as an uneven surface having a general part and a concave part recessed with respect to the general part, a blackened print layer is formed in the general part, and then an indium layer is formed on the entire of the uneven surface by a vacuum deposition method as disclosed in JP-A-2009-17125.

In the manufacturing method of the radio wave transmission cover disclosed in JP-A-2009-17125, however, the indium layer covers the entire of the uneven surface of the transparent resin layer. Indium has a radio wave transmission characteristic, but when the entire surface of the transparent resin layer is covered with the indium, since the attenuation and the phase difference of radio waves of the radio wave transmission cover become large, radio wave transmission performance is reduced.

In this regard, it is considered to partially print the indium layer only in the concave part of the uneven surface of the transparent resin layer. As an indium printing method, a screen printing method, a hot stamping method and the like are considered.

However, the screen printing method is a method in which ink is pushed out from a screen mesh and is printed. When the position of the screen mesh is slightly shifted, the boundary of a print part is shifted from the boundary part of a concave part and a convex part. Since the boundary line of characters and figures of the concave part or the convex part is not clear, appearance becomes worse.

The hot stamping method is a method in which a transfer film having a sheet printed with the indium layer is arranged on the uneven surface of the transparent resin layer, and the transfer sheet is pressed to the uneven surface by using a hot stamp while heating it, so that the indium layer is transferred to the uneven surface. In this method, there may occur a transfer error such as non-attachment of the indium layer on the sheet to the uneven surface.

Furthermore, accurately forming a metal layer of indium and the like only in the concave part of the uneven surface of the transparent resin layer is an issue of the decorative member other than the radio wave transmission cover.

SUMMARY

The present invention has been made to solve the above-described problem, and an object of the present invention is to provide a decorative member capable of accurately forming a design on an uneven surface of a transparent resin layer and a manufacturing method thereof.

According to an aspect of the present invention, there is provided a manufacturing method of a decorative member including: preparing a transparent resin layer provided on a rear surface thereof with a general portion, a stepped portion recessed or protrudingly provided with respect to the general portion, and an inclination portion provided between the stepped portion and the general portion, an inclination angle of the inclination portion with respect to a normal line of the general portion being equal to or more than 25° and being equal to or less than 40° and a width of the inclination portion being large beyond 0.38 mm and being equal to or less than 1 mm; disposing a first layer on at least the stepped portion and the inclination portion of the rear surface of the transparent resin layer; allowing a part covering the stepped portion in the first layer to remain and separating an excess part, other than the covering the stepped portion, in the first layer by laser irradiation; and disposing a second layer on a part not covered with at least the first layer of the rear surface of the transparent resin layer.

According to another aspect of the present invention, there is provided a decorative member including: a transparent resin layer provided on a rear surface thereof with a general portion, a stepped portion recessed or protrudingly provided with respect to the general portion, and an inclination portion provided between the stepped portion and the general portion; and a decorative layer provided on the rear surface of the transparent resin layer, wherein: an inclination angle of the inclination portion with respect to a normal line of the general portion is equal to or more than 25° and is equal to or less than 40°; a width of the inclination portion is large beyond 0.38 mm and is equal to or less than 1 mm; and the decorative layer includes: a first layer that covers the stepped portion of the rear surface of the transparent resin layer; and a second layer that covers a part of the rear surface of the transparent resin layer, which is not covered by at least the first layer.

According to the manufacturing method of the decorative member of the invention, the first layer is disposed on at least the concave or convex stepped portion and the inclination portion on the rear surface of the transparent resin layer, and the part covering the stepped portion in the first layer is allowed to remain, and the excess part in the first layer, other than the part covering the stepped portion, is separated by the laser irradiation. Therefore, it is possible to accurately separate the excess part. When the first layer is viewed from the surface of the transparent resin layer, it is possible to view an accurate design.

The inclination angle of the inclination portion with respect to the normal line of the general portion is 25° to 40° and the width of the inclination portion is large beyond 0.38 mm and is equal to or less than 1 mm. The width of the inclination portion is larger than separation tolerance when the first layer is separated by the laser irradiation. Therefore, even though a molding dimensional error or a positional shift at the time of installation of a laser irradiation jig occurs in the transparent resin layer, these errors are absorbed, so that the boundary line between the first layer and the separation part, from which the excess part has been separated, can be positioned on the inclination portion. The boundary line between the first layer and the separation part is allowed to be positioned on the inclination portion, so that the boundary line is prevented from being shifted on the general portion or the stepped portion.

Since the inclination angle of the inclination portion is 25° to 40°, when the first layer is viewed from the surface side of the transparent resin layer, the first layer remaining on the inclination portion is difficult to be viewed. The first layer is viewed as if it covers only the stepped portion, so that it is possible to three-dimensionally view the first layer with a good appearance.

The separation of the excess part of the first layer is performed by the laser irradiation. Since the laser has a high degree of accuracy of an irradiation position, it is possible to accurately separate the excess part of the first layer. Therefore, according to the invention, as compared with the case in which the first layer has been formed on the stepped portion by printing such as screen printing, it is possible to accurately form a design of the first layer.

For example, in the case of forming the first layer on the stepped portion by screen printing, the printing may not be performed depending on the rear surface shape of the transparent resin layer. That is, in the screen printing, since ink is pushed out from a screen mesh and is printed, the screen mesh need to be parallel to the rear surface of the transparent resin layer. When there is a protruding part which largely protrudes on the rear surface, since the protruding part causes flow mark or weld to the transparent resin layer at the time of molding, no design is established.

In contrast, when the laser is used, it is possible to reliably separate the excess part of the first layer regardless of the rear surface shape of the transparent resin layer.

In the invention, the general portion and the stepped portion of the rear surface of the transparent resin layer may be a concave portion or a convex portion. The first layer is formed on the stepped portion.

The decorative member of the invention is manufactured by the aforementioned decorative member manufacturing method, so that it is possible to view a design accurately formed on the uneven surface of the transparent resin layer.

Since the inclination angle and the width of the inclination portion are in the aforementioned range, it is possible to three-dimensionally view the first layer with a good appearance.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

A decorative member and a manufacturing method thereof according to a first embodiment will be described with reference to each of drawings.

Figure 1:
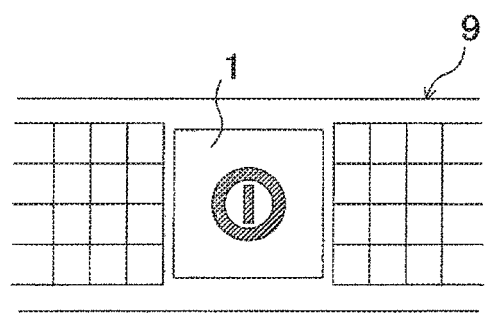
FIG. 1 is a front view of a front grill to which a decorative member of a first embodiment of the invention has been attached.
Figure 2:
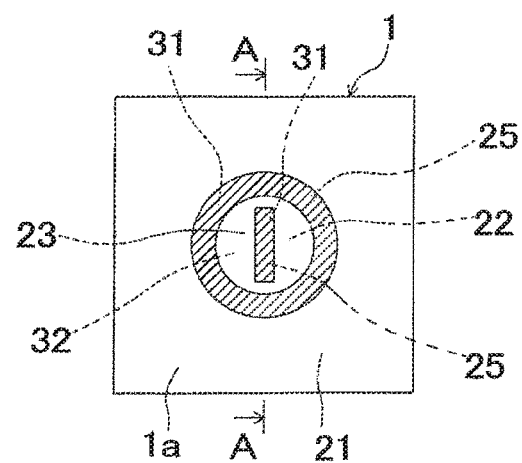
FIG. 2 is a front view of the decorative member of the first embodiment.

As illustrated in FIGS. 1 and 2, a decorative member 1 according to the present embodiment is a millimeter wave transmission cover attached to the center of a front grill 9 of a vehicle. The decorative member 1 is provided at a rear surface side thereof with a millimeter wave oscillation receiver (not illustrated).

Figure 3:
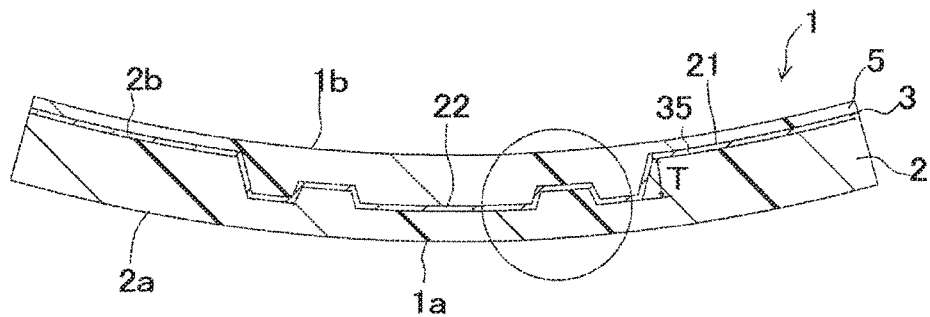
FIG. 3 is a sectional view taken along line A-A of FIG. 2.

As illustrated in FIG. 3, the decorative member 1 is a thin plate and thicknesses of its all parts are set to be n times of ½ of a wavelength of a millimeter wave. In the decorative member 1, the center is gently curved to protrude to a surface 1a side. The decorative member 1 has a transparent resin layer 2, a base layer 5, and a decorative layer 3 interposed between the transparent resin layer 2 and the base layer 5. The transparent resin layer 2 is made of a transparent resin material, and for example, PC (polycarbonate) is used.

A surface 2a of the transparent resin layer 2 is a smooth surface. A rear surface 2b of the transparent resin layer 2 has an outer peripheral part 21 and an inner part 22 positioned at an inner side from the outer peripheral part 21 and recessed respect to the outer peripheral part 21. A depth T of the inner part 22 from the outer peripheral part 21 is 2.5 mm.

The outer peripheral part 21 has a flat shape. The outer peripheral part 21 is covered by a black translucent outer peripheral print part 35.

Figure 4:
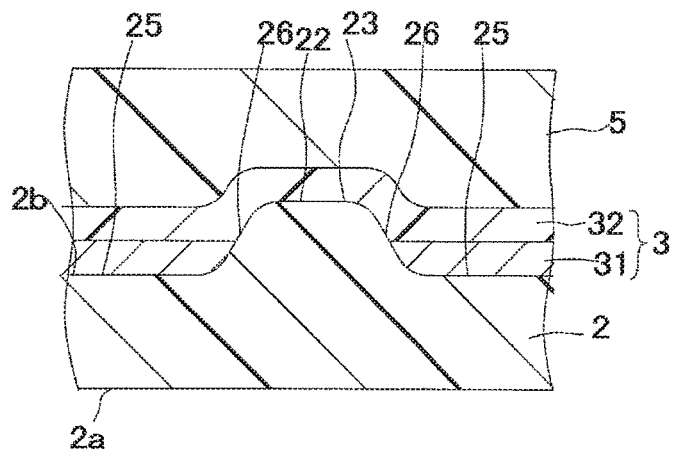
FIG. 4 is an enlarged view of a circled part of FIG. 3.
Figure 5:
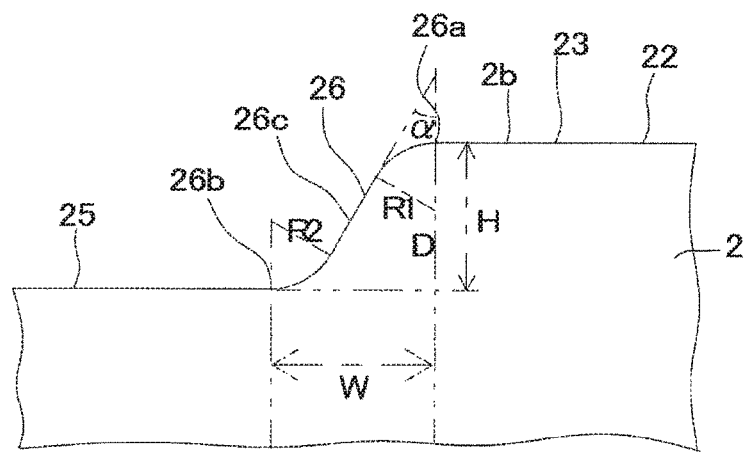
FIG. 5 is an explanation diagram of an inclination portion of a rear surface of a transparent resin layer of the first embodiment.

As illustrated in FIGS. 4 and 5, the inner part 22 has a general portion 23, a stepped portion 25 recessed with respect to the general portion 23, and an inclination portion 26 provided between the general portion 23 and the stepped portion 25. A height difference H between the stepped portion 25 and the general portion 23 of the rear surface 2b of the transparent resin layer 2, that is, a height of the inclination portion 26 is equal to or more than 0.3 mm and is equal to or less than 1.0 mm. In the present embodiment, the height difference H between the stepped portion 25 and the general portion 23 of the rear surface 2b of the transparent resin layer 2 is 0.5 mm.

As illustrated in FIG. 5, the inclination portion 26 is interposed between the general portion 23 and the stepped portion 25. An inclination angle α of the inclination portion 26 with respect to a normal line D of the general portion 23 is 30°. An upper end 26a of the inclination portion 26 is a part connected to the general portion 23, and a lower end 26b of the inclination portion 26 is a part connected to the recessed stepped portion 25. R1 and R2 of the upper end 26a and the lower end 26b of the inclination portion 26 are all chamfered in an arc shape having a curvature radius of 0.3 mm. A width W from the upper end 26a to the lower end 26b of the inclination portion 26 when the inclination portion 26 has been projected along the normal line of the rear surface 2b of the transparent resin layer 2 is 0.6 mm.

As illustrated in FIG. 4, the decorative layer 3 is provided to the rear surface 2b side of the transparent resin layer 2, and has a first layer 31 and a second layer 32 sequentially arranged from the rear surface 2b side. The first layer 31 includes a metal layer having a radio wave transmission characteristic. As the metal layer, an indium layer is preferable. The indium layer may have a sea-island structure in which indium exists insularly in various places from the standpoint of a radio wave transmission characteristic. The second layer 32 is a black coating layer. The first layer 31 has a thickness of about 40 nm to 50 nm and the second layer 32 has a thickness of about 30 μm to 40 μm.

The first layer 31 covers the recessed stepped portion 25 of the rear surface 2b of the transparent resin layer 2. The second layer 32 covers the entire of the rear surface 2b of the transparent resin layer 2. The first layer 31 including the indium is positioned at the recessed stepped portion 25 and is positioned near the surface 1a of the decorative member 1 as compared with the second layer 32 including the black coating layer. As illustrated in FIG. 2, when the decorative member 1 is viewed from the surface 1a side, a black character of the black coating layer is viewed in the brightly colored area of the indium. The brightly colored figure floats up to a front side from the black area and is three-dimensionally viewed.

The base layer 5 is made of a colored resin material, for example, AES (acrylonitrile ethylene styrene copolymer).

Figure 6:
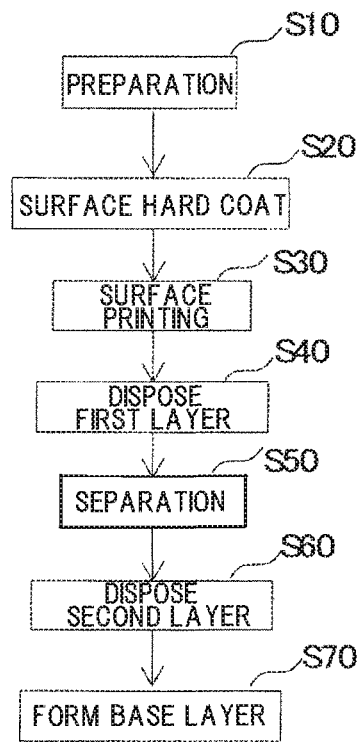
FIG. 6 is a flowchart illustrating a manufacturing method of the decorative member of the first embodiment.

A manufacturing method of the decorative member 1 of the present embodiment will be described using a flowchart of FIG. 6.

In step S10 (preparation step), polycarbonate resin is injection-molded using a mold, so that the transparent resin layer 2 is obtained.

In step S20 (surface hard coat step), a hard coat process is performed for the surface 2a of the transparent resin layer 2.

Figure 7:
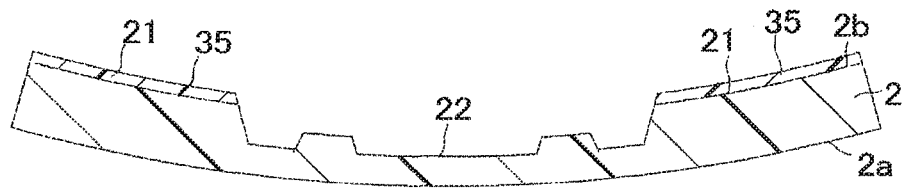
FIG. 7 is a sectional view of the transparent resin layer, in which an outer peripheral part of the rear surface has been subjected to black printing, for explaining the manufacturing method of the decorative member of the first embodiment.

In step S30 (rear surface printing step), as illustrated in FIG. 7, blank ink is printed on the outer peripheral part 21 of the rear surface 2b of the transparent resin layer 2 by a screen printing method and the like, so that the black translucent outer peripheral print part 35 is formed on the outer peripheral part 21.

Figure 8:
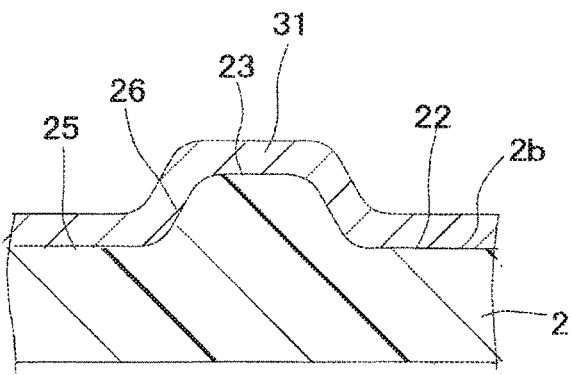
FIG. 8 is a sectional view of the transparent resin layer on which a first layer has been disposed, which is subsequent to FIG. 7.

In step S40 (first layer disposing step), as illustrated in FIG. 8, the first layer 31 including indium is formed on the entire of the inner part 22 of the rear surface 2b of the transparent resin layer 2 by a sputtering method. The first layer 31 may be formed by a deposition method.

Figure 9:
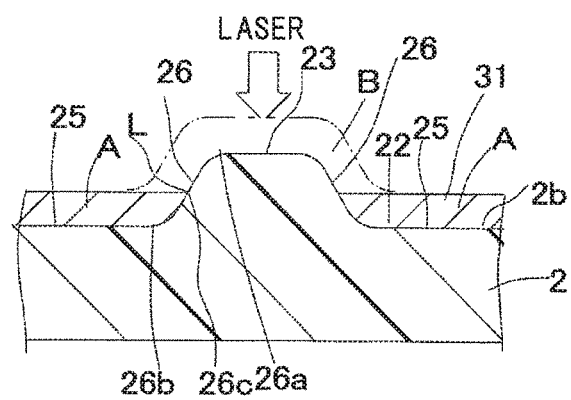
FIG. 9 is a sectional view of the transparent resin layer after a separation step, which is subsequent to FIG. 8.

In step S50 (separation step), as illustrated in FIG. 9, the transparent resin layer 2 is fixed to a jig such that the rear surface 2b of the transparent resin layer 2 is upward. In the first layer 31 on the rear surface 2b of the transparent resin layer 2, laser is irradiated to an excess part B, other than a part A covering the stepped portion 25, so that the excess part B is separated. As the laser irradiation device, MDV9920 (product name) manufactured by keyence Corporation has been used. The laser irradiation energy per unit area is 0.45 mJ. In the laser irradiation conditions, a laser spot diameter is 0.08 mm, a laser spot pitch is 0.064 mm, a laser frequency is 120 kHz, and a laser wavelength is 1064 nm. It is sufficient if laser transmittance is 5% to 90%, and it is preferable that a laser movement speed is 600 mm/sec to 1300 mm/sec. In this case, there is no discoloration due to laser burning of the transparent resin layer 2 and residue of the indium, which is the first layer 31, is also not seen.

The boundary between the irradiation area and the non-irradiation area of the laser is set as a center 26c in the width direction of the inclination portion 26. The excess part B separated by the laser is an area from the general portion 23 and the upper end 26a of the inclination portion 26 to the center 26c in terms of design. When measuring a molding error range of the transparent resin layer 2, a positional shift range of a fixing jig for laser irradiation, and a variation range of a laser irradiation position, they are sequentially ±0.17 mm, ±0.1 mm, and ±0.02 mm. Their total error is ±0.29 mm, and is separation tolerance by which a separation position may be shifted with respect to the transparent resin layer 2. On the other hand, as illustrated in FIGS. 4 and 9, the width W of the inclination portion 26 is 0.6 mm and the inclination portion 26 exists in an area of ±0.3 mm from the center 26c of the inclination portion 26. Since the shift range of the laser irradiation position with respect to the transparent resin layer 2 is ±0.29 mm, the laser enters into the width (±0.3 mm) from the center 26c of the inclination portion 26. Therefore, when the excess part B of the first layer 31 is separated by the laser irradiation, a boundary line L between the first layer 31 and the separation part is positioned on the inclination portion 26. The first layer 31 does not almost remain in the upper end 26a side of the inclination portion 26 and mainly remains in the lower end 26b as compared with the upper end 26a side. The boundary line L between the first layer 31 and the separation part is positioned in the center 26c of the inclination portion 26 in many cases.

Figure 10:
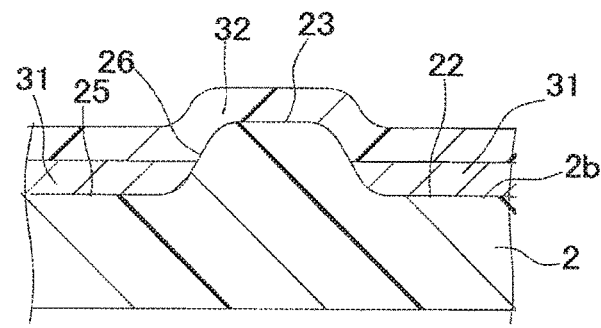
FIG. 10 is a sectional view of the transparent resin layer on which a second layer has been disposed, which is subsequent to FIG. 9.

In step S60 (second layer disposing step), as illustrated in FIG. 10, the second layer 32 is formed on the inner part 22 of the rear surface 2b side of the transparent resin layer 2 by coating using a black paint. The second layer 32 is an opaque black layer. The black paint has been obtained by mixing coloring with a resin material. For example, the coloring is carbon black and the resin material is acryl resin; however, the invention is not limited thereto.

In step S70 (base layer formation step), the transparent resin layer 2 is inserted into the mold and colored AES is injection-molded at the rear surface 2b side of the transparent resin layer 2, so that the base layer 5 is formed on the entire of the rear surface 2b side.

As above, the decorative member 1 of the present embodiment is obtained.

According to the manufacturing method of the decorative member 1 of the present embodiment, the first layer 31 is disposed on the entire of the rear surface 2b of the transparent resin layer 2, the part A covering the stepped portion 25 in the first layer 31 is allowed to remain, and the excess part B, other than the part A, is separated by laser irradiation. Therefore, it is possible to accurately separate the excess part B. When the first layer 31 is viewed from the surface 2a of the transparent resin layer it is possible to view an accurate design.

The inclination angle α of the inclination portion 26 with respect to the normal line D of the general portion 23 is 25° to 40° and the width W of the inclination portion 26 is large beyond 0.38 mm and is equal to or less than 1 mm. In the present embodiment, the inclination angle α of the inclination portion 26 with respect to the normal line D of the general portion 23 is 30°, and the width W of the inclination portion 26 is 0.6 mm.

The width W of the inclination portion 26 is larger than the range 0.58 mm of the separation tolerance (±0.29 mm). When laser is irradiated aiming at the center 26c of the inclination portion 26, even though a laser irradiation positional shift occurs at the upper end 26a side or the lower end 26b side from the center 26c, the inclination portion 26 absorbs the shift, so that it is possible to allow the boundary line L between the first layer 31 and the separation part, from which the excess part B has been separated, to be positioned on the inclination portion 26. Since the shift of the boundary line L between the first layer 31 and the separation part is positioned on the inclination portion 26, the boundary line L is prevented from being shifted on the general portion 23 or the stepped portion 25. When the first layer 31 is viewed from the surface 2a of the transparent resin layer 2, since the first layer 31 is viewed as if it covers only the stepped portion 25, it is possible to three-dimensionally view the first layer 31 with a good appearance.

When the inclination angle α is smaller than 25°, even though a molding dimensional error of the transparent resin layer 2 or a laser irradiation positional shift at the time of installation of a laser irradiation jig occurs, the inclination portion 26 may not absorb the shift, or the boundary line L between the first layer 31 and the separation part may be positioned on the general portion 23 or the stepped portion 25. When the inclination angle α exceeds 40°, if it is viewed from the surface 1a side of the decorative member 1, the inclination portion 26 is viewed. The boundary line L on the inclination portion 26 is apparently viewed and the contour of the first layer 31 appears to protrude as compared with the contour of the stepped portion 25, so that the appearance of the first layer 31 may be reduced.

In the separation step, the separation of the excess part B of the first layer 31 is performed by the laser irradiation. Since the laser has a high degree of accuracy of an irradiation position, it is possible to accurately separate the excess part B of the first layer 31. Therefore, according to the separation step of the present embodiment, as compared with the case in which the first layer 31 has been formed on the stepped portion 25 by printing such as screen printing, it is possible to accurately form a design of the first layer 31.

For example, when the first layer 31 is formed on the stepped portion 25 by screen printing, the printing may not be performed depending on the rear surface shape of the transparent resin layer 2. That is, in the screen printing, since ink is pushed out from a screen mesh and is printed, the screen mesh need to be parallel to the rear surface 2b of the transparent resin layer 2. When there is a protruding part which largely protrudes on the rear surface 2b, since the protruding part causes flow mark or weld to the transparent resin layer 2 at the time of molding, no design is established.

In contrast, when the laser is used, it is possible to reliably separate the excess part B of the first layer 31 regardless of the rear surface shape of the transparent resin layer 2, so that the first layer 31 can remain on the stepped portion 25.

The decorative member 1 of the present embodiment is manufactured by the aforementioned decorative member manufacturing method, so that it is possible to view a design accurately formed on the uneven surface of the transparent resin layer 2.

When the rear surface 2b of the transparent resin layer 2 after laser irradiation is observed by SEM (scanning electronic microscope), a sea-island structure is recognized in which indium exists insularly in many places of the part A of the first layer 31 subjected to no laser irradiation. The first layer 31 has not been observed in the separation part. In the inclination portion 26, the boundary line L between the part A of the first layer 31 and the separation part is arranged. When the decorative member 1 is viewed from the surface 1a side, since the first layer 31 is viewed as if it covers only the stepped portion 25, it is possible to three-dimensionally view the first layer 31 with a good appearance. Around the boundary line L of the part A, the sea-island structure of the indium remains. Around the boundary line L of the part A, residues of PC (components of the transparent resin layer) having a size of about 1 μm have been observed. Since the thickness of the second layer 32 is 30 μm, the residues of about 1 μm do not affect external appearance, an adhesion property, and millimeter wave attenuation.

In the transparent resin layer, when measuring optical attenuation of the separation part, from which the first layer has been separated by laser irradiation, and optical attenuation of the transparent resin layer before the first layer is formed, both are low with the same degree.

The color of the transparent resin layer (a resin layer before being processed) before the first layer is formed and the color of the transparent resin layer (a resin layer after separation) after laser separation have been measured with an L*a*b* display system. The laser irradiation conditions are similar to the aforementioned conditions of the present embodiment. From the measured values of the color of the resin layer before being processed and the color of the resin layer after separation, a color difference ΔE of the resin layer after separation from the resin layer before being processed has been obtained. When the color difference ΔE is smaller than 1.5, it can be understood that it is not possible to recognize the color difference of the two. These results are illustrated in Table 1 below.

TABLE 1

| | Transmission color tone L*a*b* value | | | |
|---|---|---|---|---|
| | L* | a* | b* | Color difference ΔE |
| Resin layer before being processed | 95.79 | −0.08 | 0.31 | |
| Resin layer after separation | 95.33 | −0.09 | 0.77 | 0.65 |

The color difference ΔE from the resin layer before being processed and the resin layer after separation is 0.65. From this fact, it can be understood that laser is irradiated to the first layer, so that it is possible to separate the first layer from the rear surface of the transparent resin layer to the extent that the first layer is not recognizable.

Second Embodiment

Figure 11:
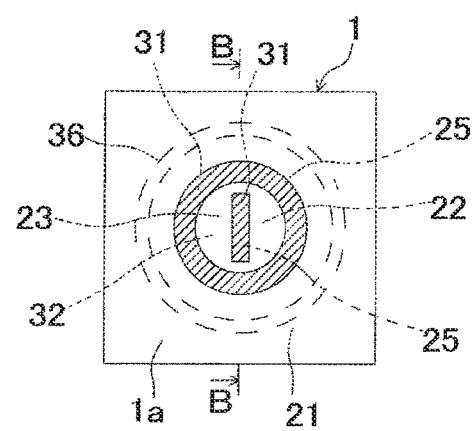
FIG. 11 is a front view of a decorative member of a second embodiment.
Figure 12:
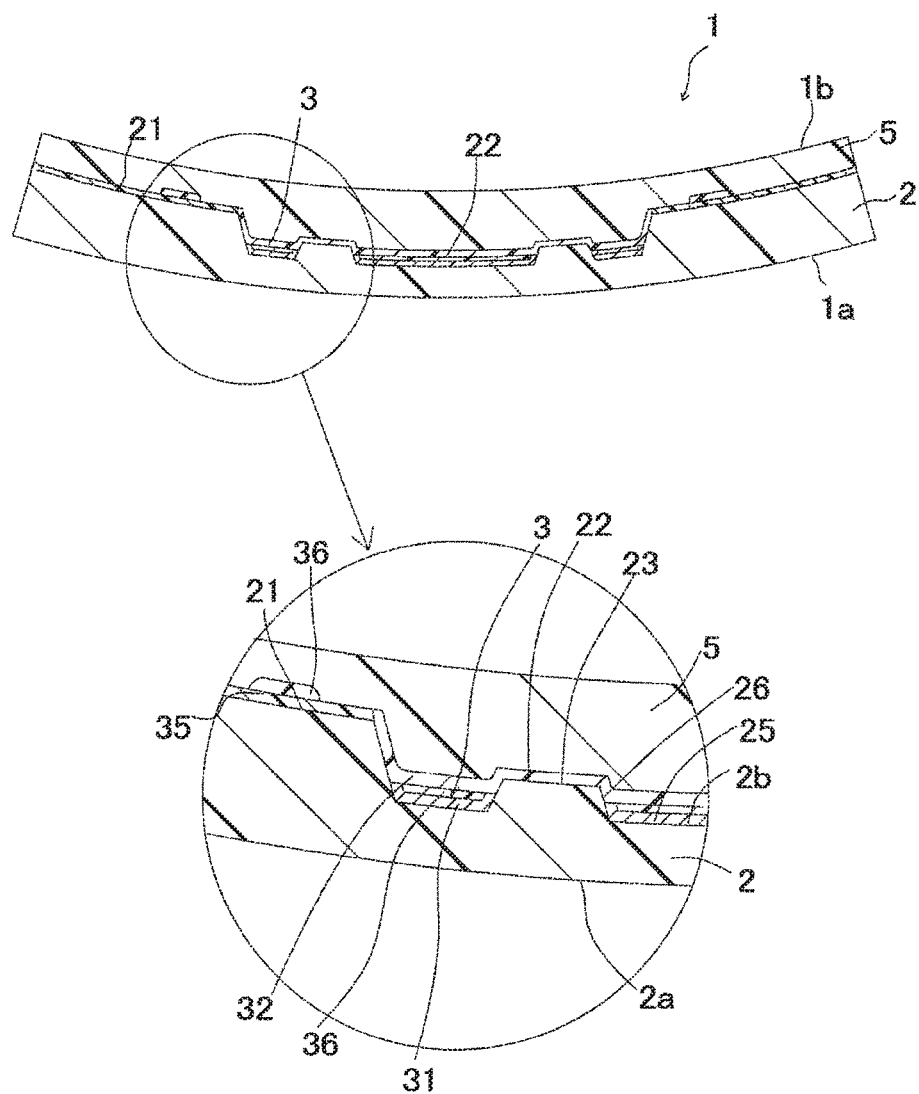
FIG. 12 is a sectional view taken along line B-B of FIG. 11.

A decorative member 1 of the present embodiment is different from the first embodiment in that a pattern layer 36 is coated on the outer peripheral part 21 of the rear surface 2b of the transparent resin layer 2 as illustrated in FIGS. 11 and 12.

Figure 13:
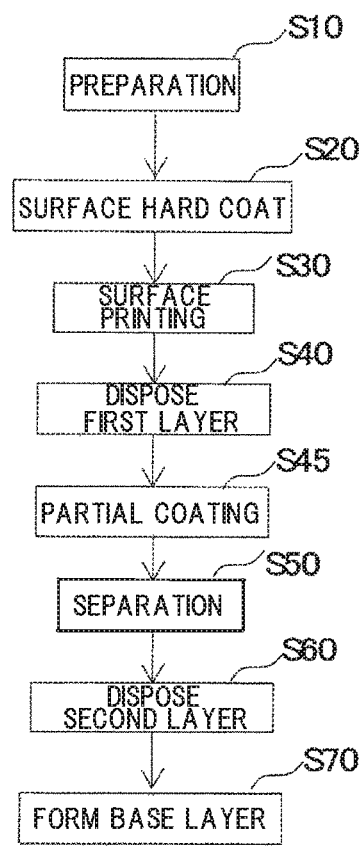
FIG. 13 is a flowchart illustrating a manufacturing method of the decorative member of the second embodiment.

In order to manufacture the decorative member 1 of the present embodiment, steps S10, S20, S30, and S40 have been performed as illustrated in FIG. 13, similarly to the first embodiment. On the rear surface 2b of the transparent resin layer 2 after step S40, the first layer 31 is formed on the entire of the inner part 22 (see FIG. 8).

Figure 14:
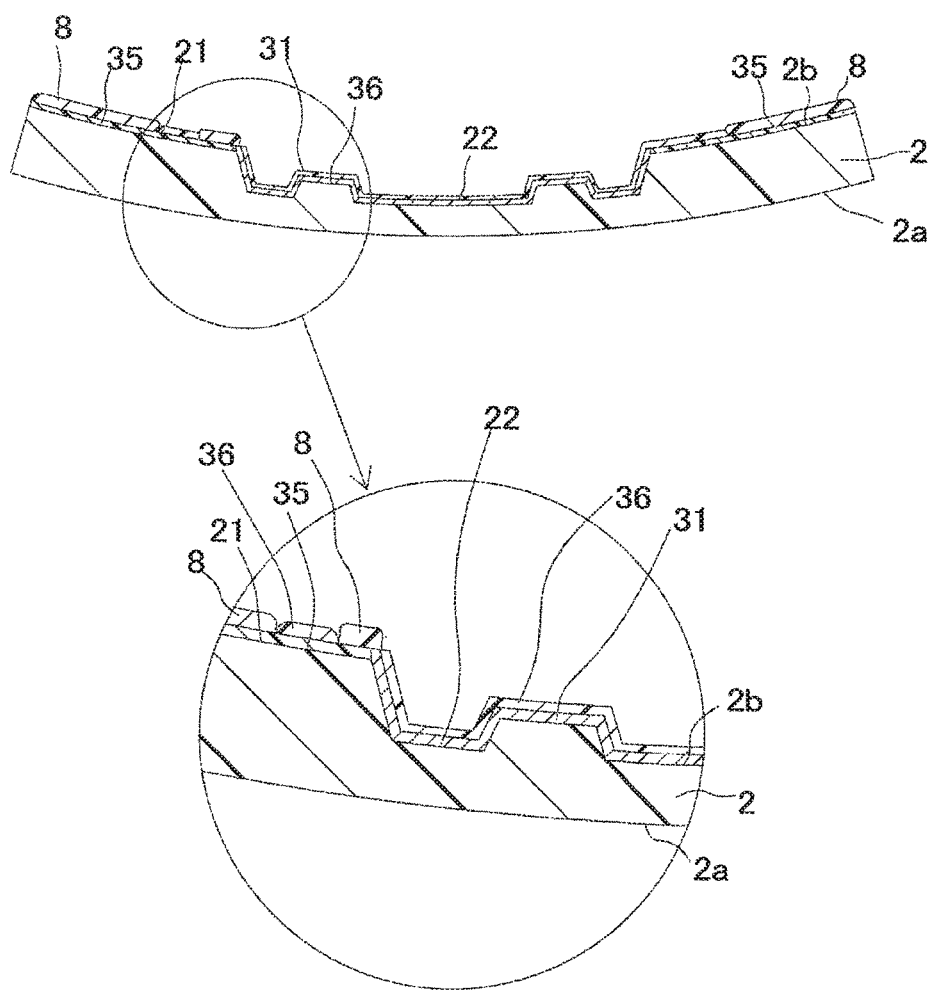
FIG. 14 is a sectional view of the transparent resin layer, on which a pattern layer and a first layer have been disposed, for explaining the manufacturing method of the decorative member of the second embodiment.

After step S40 (first layer disposing step), step S45 (a partial coating step) is performed. In step S45, the pattern layer 36 is coated on a part of the outer peripheral part 21 of the rear surface 2b of the transparent resin layer 2 or the entire of the inner part 22 as illustrated in FIG. 14. In order to form the pattern layer 36, in the state in which a part of the outer peripheral part 21, other than a pattern layer formation part, is covered with a mask 8, the rear surface 2b of the transparent resin layer 2 is coated, and then the mask 8 is removed. For the pattern layer 36, an opaque colored paint of a brown and the like has been used.

Figure 15:
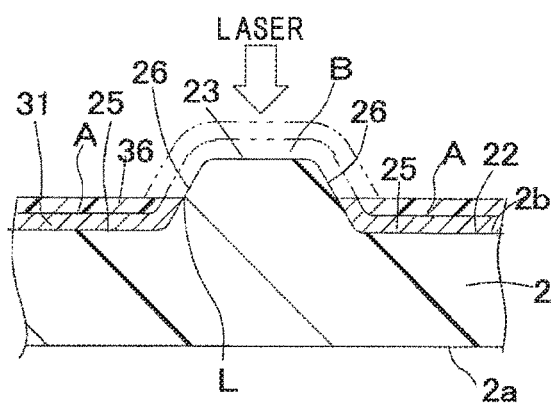
FIG. 15 is a sectional view of the transparent resin layer after a separation step, which is subsequent to FIG. 14.

In step S50 (separation step), as illustrated in FIG. 15, in the first layer 31 and the pattern layer 36 on the rear surface 2b of the transparent resin layer 2, laser is irradiated to an excess part B, other than the part A covering the stepped portion 25, so that the excess part B is separated. The laser irradiation conditions are similar to those of the first embodiment except that the irradiation energy per unit area is 3.2 mJ. The width W of the inclination portion 26 of the rear surface 2b of the transparent resin layer 2 is 0.6 mm and the inclination angle α of the inclination portion 26 is 30°. The width W and the inclination angle α are similar to those of the first embodiment Since the width W is larger than separation tolerance (±0.29 mm) due to the difference of laser irradiation as described in the first embodiment, even though positional shift of laser irradiation occurs, the boundary line L between the first layer 31 and the pattern layer 36 remaining after the separation and the separation part thereof is positioned on the inclination portion 26.

Figure 16:
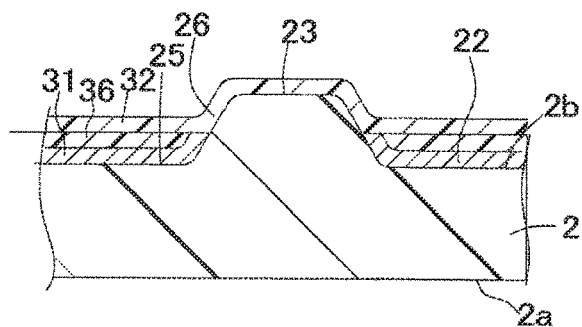
FIG. 16 is a sectional view of the transparent resin layer on which a second layer has been disposed, which is subsequent to FIG. 15.

In step S60 (second layer disposing step), as illustrated in FIG. 16, a black coating layer is disposed at the rear surface 2b side of the transparent resin layer 2 as the second layer 32.

In step S70 (base layer formation step), as illustrated in FIG. 12, the rear surface 2b of the transparent resin layer 2, on which the second layer 32 has been formed, is covered with the base layer 5. The formation of the base layer 5 has been performed similarly to the first embodiment.

As above, the decorative member 1 of the present embodiment has been obtained.

When the obtained decorative member 1 is viewed from the surface, the pattern layer 36 is recognized at the outer peripheral part 21 through a transparent black outer peripheral print part 35. At the inner part 22, the pattern layer 36 is conceal to the rear surface side of the first layer 31 and is not seen. At the inner part 22, the bright color of the indium of the first layer 31 stands out on a front side and is three-dimensionally recognized in the black area of the second layer 32 similarly to the first embodiment.

Third Embodiment

Figure 17:
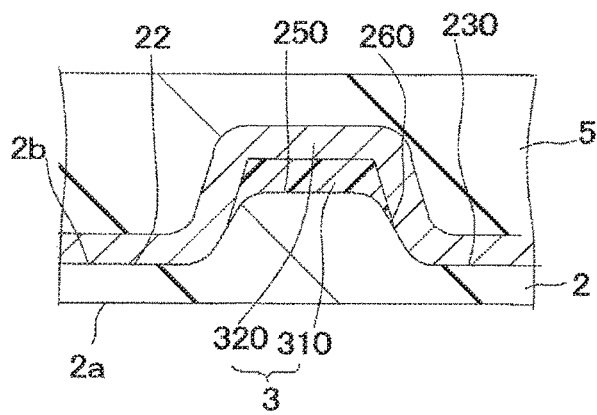
FIG. 17 is a partially enlarged sectional view of a decorative member of a third embodiment.

A decorative member 1 of the present embodiment is different from the first embodiment in that a first layer 310 of the decorative layer 3 is a black coating layer and a second layer 320 is an indium layer as illustrated in FIG. 17.

The first layer 310 is formed on a stepped portion 250 protrudingly provided in the inner part 22 of the rear surface 2b of the transparent resin layer 2. On the rear surface 2b of the transparent resin layer 2, the second layer 320, which is the indium layer, is formed on the entire of the inner part 22, including the first layer 310.

In order to manufacture the decorative member 1 of the present embodiment, steps S10, S20, and S30 have been performed (see FIG. 6), similarly to the first embodiment. On the rear surface 2b of the transparent resin layer 2 after step S30, a black translucent outer peripheral print part 35 is formed on the outer peripheral part 21 (see FIG. 7).

Figure 18:
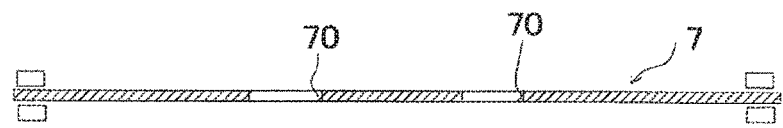
FIG. 18 is a sectional view of a transparent resin layer, in which a screen mesh has been arranged at a rear surface side, for explaining a manufacturing method of the decorative member of the third embodiment.
Figure 18:
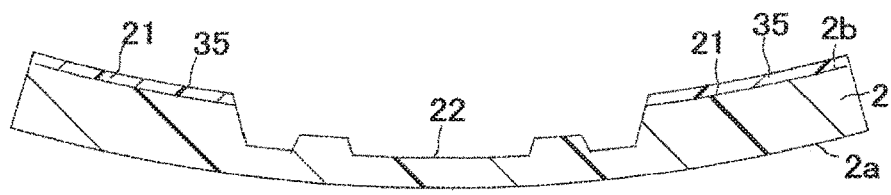
Figure 19:
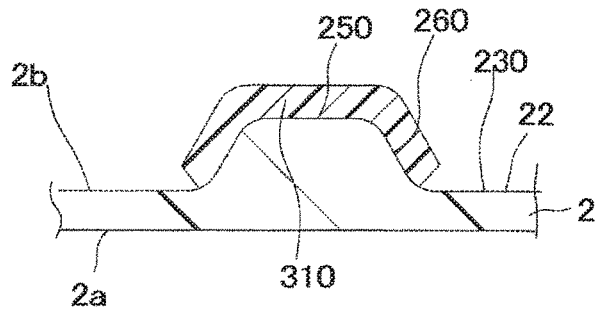
FIG. 19 is a sectional view of a transparent resin layer on which a first layer has been formed on a rear surface by a screen printing method, which is subsequent to FIG. 18.

In step S40 (first layer disposing step), as illustrated in FIG. 18, a screen mesh 7 is arranged at the rear surface 2b side of the transparent resin layer 2. In the screen mesh 7, holes 70 are opened in parts corresponding to the stepped portion 250 and an inclination portion 260. As illustrated in FIGS. 18 and 19, black ink is pushed out from the holes 70 of the screen mesh 7, so that the first layer 310 is formed on the stepped portion 250 and the inclination portion 260. In the screen printing using the screen mesh 7, since printing position accuracy is lower than that of laser, the first layer 310 is formed on the inclination portion 260 as well as the stepped portion 250 by the screen printing, and the first layer 310 on the inclination portion 260 is separated by laser in a subsequent separation step. The black ink used in the screen printing is similar to the black ink in step S60 (second layer disposing step) in the first embodiment.

Figure 20:
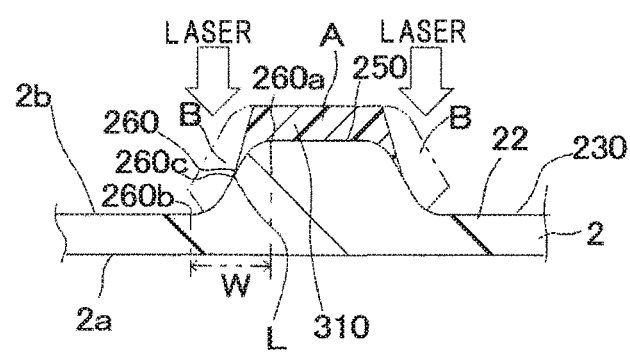
FIG. 20 is a sectional view of the transparent resin layer when a separation step is being performed, which is subsequent to FIG. 19.

In step S50 (separation step), as illustrated in FIG. 20, laser is irradiated to an excess part B of the first layer 310, so that the excess part B is separated. In this way, the first layer 310 remains on the stepped portion 250 of the rear surface 2b of the transparent resin layer 2.

In the present embodiment, laser is set to be irradiated to an area from a general portion 230 to a center 260c of the inclination portion 260. The excess part B separated by the laser is an area from a lower end 260b to the center 260c of the inclination portion 260 in the first layer 310 in terms of design. Similarly to the first embodiment, separation tolerance is ±0.29 mm. The separation tolerance is smaller than the width W (±0.30 mm) from the center 260c of the inclination portion 260, Therefore, also in the present embodiment, when the excess part B of the first layer 310 is separated by laser irradiation, the boundary line L between the first layer 310 and the separation part is positioned on the inclination portion 260.

In step S60 (second layer disposing step), as illustrated in FIG. 17, the indium layer as the second layer 320 is disposed on the entire of the inner part 22. The indium layer can be disposed by a sputtering method or a deposition method.

Thereafter, step S70 (base layer formation step) is performed similarly to the first embodiment, so that the decorative member 1 of the present embodiment is obtained.

When the decorative member 1 of the present embodiment is viewed from the surface 1a side, the bright color part of the second layer 320 formed on the general portion 230 and including indium floats up and is three-dimensionally and clearly seen during black coating.

In step S40 (first layer disposing step), the first layer 310 is formed as a coating layer by using the screen mesh 7. When positional shift occurs in the screen mesh 7, the first layer 310 causes positional shift. However, since the first layer 310 is accurately trimmed by laser in step S50 (separation step), it is possible to form the first layer 310 at an accurate position.

The first layer 310 is formed in advance on the stepped portion 250 and the inclination portion 260 around the stepped portion 250 by the screen printing, and a part of the first layer 310 covering the stepped portion 250 is separated by laser afterward. Therefore, an area of a laser separation area becomes small. It is possible to shorten a laser separation time.

The decorative member 1 of the aforementioned embodiment is a radio wave transmission cover for millimeter waves, but can also be used in a radio wave transmission cover for other electric waves. The decorative member 1 of the aforementioned embodiment can also be used as emblems for decoration. These emblems are not limited to vehicles, and can be used in all scenes.

(1) The manufacturing method of the decorative member 1 of the present embodiment includes a preparation step of preparing the transparent resin layer 2 provided on the rear surface 2b thereof with the general portions 23 and 230, the stepped portion 25 recessed or the stepped portion 250 protrudingly provided with respect to the general portions 23 and 230, and the inclination portions 26 and 260 provided between the stepped portions 25 and 250 and the general portions 23 and 230, inclination angles α of the inclination portions 26 and 260 with respect to the normal lines D of the general portions 23 and 230 being 25° to 40° and widths W of the inclination portions 26 and 260 being large beyond 0.38 mm and being equal to or less than 1 mm, a first layer disposing step of disposing first layers 31 and 310 on at least the stepped portions 25 and 250 and the inclination portions 26 and 260 of the rear surface 2b of the transparent resin layer 2, a separation step of allowing parts A covering the stepped portions 25 and 250 in the first layers 31 and 310 to remain and separating excess parts B, other than the parts A, in the first layers 31 and 310 by laser irradiation, and a second layer disposing step of covering parts not covered with at least the first layers 31 and 310 of the rear surface 2b of the transparent resin layer 2.

According to the aforementioned configuration, the first layers 31 and 310 are disposed on at least the concave or convex stepped portions 25 and 250 and the inclination portions 26 and 260 in the rear surface 2b of the transparent resin layer 2, and the parts A covering the stepped portions 25 and 250 in the first layers 31 and 310 are allowed to remain, and the excess parts B, other than the parts A, are separated by the laser irradiation. Therefore, it is possible to accurately separate the excess parts B. When the first layers 31 and 310 are viewed from the surface 2a of the transparent resin layer 2, it is possible to view an accurate design.

The inclination angles α of the inclination portions 26 and 260 with respect to the normal lines D of the general portions 23 and 230 are 25° to 40° and the widths W of the inclination portions 26 and 260 are large beyond 0.38 mm and are equal to or less than 1 mm. The widths W of the inclination portions 26 and 260 are larger than separation tolerance when the first layers 31 and 310 are separated by the laser irradiation. Therefore, even though a molding dimensional error or a positional shift at the time of installation of a laser irradiation jig occurs in the transparent resin layer 2, these errors are absorbed, so that the boundary lines L between the first layers 31 and 310 and the separation parts, from which the excess parts B have been separated, can be positioned on the inclination portions 26 and 260. The boundary lines L between the first layers 31 and 310 and the separation parts are allowed to be positioned on the inclination portions 26 and 260, so that the boundary lines L are prevented from being shifted on the general portions 23 and 230 or the stepped portions 25 and 250.

Since the inclination angles α of the inclination portions 26 and 260 are 25° to 40°, when the first layers 31 and 310 are viewed from the surface side of the transparent resin layer, the first layers 31 and 310 remaining on the inclination portions 26 and 260 are difficult to be viewed. The first layer 31 is viewed as if it covers only the stepped portion 25, so that it is possible to three-dimensionally view the first layer 31 with a good appearance.

In the separation step, the separation of the excess parts B of the first layers 31 and 310 is performed by the laser irradiation. Since the laser has a high degree of accuracy of an irradiation position, it is possible to accurately separate the excess parts B of the first layers 31 and 310. Therefore, according to the separation step of the aforementioned embodiment, as compared with the case in which the first layers 31 and 310 are formed on the stepped portions 25 and 250 by printing such as screen printing, it is possible to accurately form designs of the first layers 31 and 310.

For example, in the case of forming the first layers 31 and 310 by the screen printing, the printing may not be performed depending on the rear surface shape of the transparent resin layer 2, That is, in the screen printing, since ink is pushed out from a screen mesh and is printed, the screen mesh need to be parallel to the rear surface 2b of the transparent resin layer 2. When there is a protruding part which largely protrudes on the rear surface 2b, since the protruding part causes flow mark or weld to the transparent resin layer 2 at the time of molding, no design is established.

In contrast, when the laser is used, it is possible to reliably separate the excess parts B of the first layers 31 and 310 regardless of the shape of the rear surface 2b of the transparent resin layer 2, so that it is possible to form designs of the first layers 31 and 310.

In the aforementioned embodiment, the general portions 23 and 230 and the stepped portions 25 and 250 of the rear surface 2b of the transparent resin layer 2 may be concave portions or convex portions. In the separation step, the first layers 31 and 310 remain on the stepped portions 25 and 250.

(2) Preferably, the first layer is made of indium, and in the separation step, irradiation energy per unit area of laser irradiated to the first layer is 0.3 mJ to 0.6 mJ. In this case, it is possible to sufficiently separate the excess part B of the first layer 31 by laser irradiation without a change in the color of the transparent resin layer 2.

(3) After the first layer disposing step, it is preferable to perform a coating step of forming a paint layer (the pattern layer 36) including a paint on the rear surface 2b of the transparent resin layer 2 and including a part in which the first layer 31 has been formed. It is possible to form a design with a good appearance.

(4) In the aforementioned (3), preferably, the first layer 31 is made of indium and in the separation step, irradiation energy per unit area of laser irradiated to an overlap part of the first layer 31 and the paint layer (the pattern layer 36) is 2.5 mJ to 3.8 mJ. In this case, it is possible to sufficiently separate the excess parts B of the first layer 31 and the paint layer by laser irradiation without a change in the color of the transparent resin layer 2.

(5) In the separation step, preferably, the boundary between an irradiation area and a non-irradiation area of the laser is set as the centers 26c and 260c in the width direction of the inclination portions 26 and 260. Even though a molding dimensional error or a positional shift at the time of installation of a laser irradiation jig occurs in the transparent resin layer 2, the inclination portions 26 and 260 absorb these errors, so that the boundary lines L between the first layers 31 and 310 and the separation parts, from which the excess parts B have been separated, can be positioned on the inclination portions 26 and 260.

(6) The decorative member 1 of the aforementioned embodiment is the decorative member 1 having the transparent resin layer 2 provided on the rear surface 2b thereof with the general portions 23 and 230, the stepped portions 25 and 250 recessed or protrudingly provided with respect to the general portions 23 and 230, and the inclination portions 26 and 260 provided between the stepped portions 25 and 250 and the general portions 23 and 230, and the decorative layer 3 provided on the rear surface 2b of the transparent resin layer 2, the inclination portions 26 and 260 are provided between the stepped portions 25 and 250 and the general portions 23 and 230, the inclination angles α of the inclination portions 26 and 260 with respect to the normal lines D of the general portions 23 and 230 being 25° to 40°, the widths W of the inclination portions 26 and 260 are large beyond 0.38 mm and are equal to or less than 1 mm, and the decorative layer 3 has the first layers 31 and 310 that cover the stepped portions 25 and 250 of the rear surface 2b of the transparent resin layer 2, and the second layers 32 and 320 that cover parts of the rear surface 2b of the transparent resin layer 2, which are not covered by at least the first layers 31 and 310.

The decorative member 1 of the present embodiment is manufactured by the aforementioned manufacturing method of the decorative member 1, so that it is possible to view a design accurately formed on the uneven surface of the transparent resin layer 2.

Since the inclination angle α and the width W of the inclination portion 26 are in the aforementioned range, it is possible to three-dimensionally view the first layers 31 and 310 with a good appearance.

(7) Preferably, in the stepped portions 25 and 250 of the rear surface 2b of the transparent resin layer 2, a height difference H with the general portions 23 and 230 is equal to or more than 0.3 mm and is equal to or less than 1.0 mm. By the height difference between the first layers 31 and 310 formed on the recessed or protrudingly provided stepped portions 25 and 250 and the second layers 32 and 320 formed on the general portions 23 and 230, it is possible to view a three-dimensional design.

(8) Preferably, any one of the first layers 31 and 310 and the second layers 32 and 320 is a metal layer and the other one of the first layers 31 and 310 and the second layers 32 and 320 is a colored layer. By contrast between a bright design due to the metal layer and a design due to the colored layer, it is possible to realize a design having an appearance.

(9) Preferably, the metal layer is made of indium. Since the indium has a radio wave transmission characteristic, the decorative member 1 of the present embodiment can be used as a radio wave transmission cover.

(10) Preferably, the boundary line L between parts covered with the first layers 31 and 310 on the rear surface 2b of the transparent resin layer 2 and parts not covered with the first layers 31 and 310 is positioned on the inclination portions 26 and 260. In this case, even though disposal positions of the first layers 31 and 310 are shifted during a manufacturing process, it is possible to allow the first layer to reliably cover the entire of the stepped portions 25 and 250. Since the inclination portions 26 and 260 have the aforementioned predetermined inclination angle α, when it is viewed from the surface 1a side of the decorative member 1, the first layers 31 and 310 on the inclination portions 26 and 260 are not almost seen and it seems as if the first layers 31 and 310 are disposed only on the stepped portions 25 and 250. By the height difference H between the first layers 31 and 310 and the second layers 32 and 320, it is possible to view a three-dimensional design.

In addition, it is sufficient if a decorative member has the following aspects.

(11) Preferably, the rear surface 2b of the transparent resin layer 2 has a base area (the outer peripheral part 21) and a main area (the inner part 22) recessed or protrudingly provided with respect to the base area, the main area has the general portions 23 and 230, the stepped portions 25 and 250, and the inclination portions 26 and 260, and a height difference between the main area and the base area is equal to or more than 2.5 mm. In the main area, a design is formed by the decorative layer 3 covering the stepped portions 25 and 250. When the main area has been protrudingly provided with respect to the base area, the design formed in the main area is seen to float up. When the main area has been recessed with respect to the base area, the design formed in the main area is seen to be deeply sunk with respect to the base area. As described above, since the height difference of the main area with respect to the base area is equal to or more than 2.5 mm, it is possible to more three-dimensionally view the design formed in the main area. Even if there is a large height difference equal to or more than 2.5 mm, it is possible to accurately and reliably perform the separation step by laser irradiation.

(12) Preferably, the decorative layer 3 is covered by the base layer 5. The decorative layer is disposed between the transparent resin layer 2 and the base layer 5, so that the decorative member is easily used as an emblem or a radio wave transmission cover.

(13) Preferably, the decorative member is a radio wave transmission cover.

What is claimed is:
1. A manufacturing method of a decorative member for covering a millimeter wave receiver of a vehicle comprising:
preparing a transparent resin layer provided on a rear surface thereof with a general portion, a stepped portion recessed or protrudingly provided with respect to the general portion, and an inclination portion provided between the stepped portion and the general portion, an inclination angle of the inclination portion with respect to a normal line of the general portion being equal to or more than 25° and being equal to or less than 40° and a width of the inclination portion being large beyond 0.38 mm and being equal to or less than 1 mm;

disposing a first layer, including a metal layer having a wavelength characteristic adapted to the millimeter wave receiver, on at least the stepped portion and the inclination portion of the rear surface of the transparent resin layer;

allowing a part covering the stepped portion in the first layer to remain and separating an excess part, other than the covering the stepped portion, in the first layer by Laser irradiation, wherein when the excess part is separated, a boundary between an irradiation area and a non-irradiation area of the laser is set as a center in a width direction of the inclination portion; and disposing a second layer, made of a paint, on the rear surface of the transparent resin layer after the first layer is disposed, wherein the first layer and the second layer are included in a decorative layer for the vehicle.

2. The manufacturing method of the decorative member according to claim 1, wherein the first layer is made of indium, and when the excess part is separated, irradiation energy of laser irradiated to the first layer is equal to or more than 0.3 mJ and is equal to or less than 0.6 mJ.

3. The manufacturing method of the decorative member according to claim 1, wherein the first layer is made of indium, and when the excess part is separated, irradiation energy per unit area of laser irradiated to an overlap part of the first layer and the paint layer is equal to or more than 2.5 mJ and is equal to or less than 3.8 mJ.

4. The manufacturing method of the decorative member according to claim 1, the decorative layer displaying the first layer and the second layer viewable through the transparent resin layer from a front surface of the decorative member.

* * * * *